March 31, 1970 L. J. TRECEK 3,504,067
METHOD AND APPARATUS FOR MANUFACTURING COLLAPSIBLE
FLEXIBLE PLASTIC CONTAINER TUBES
Original Filed Nov. 10, 1965 2 Sheets-Sheet 1
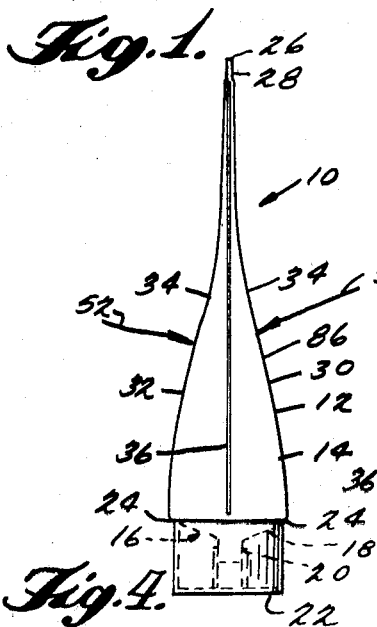
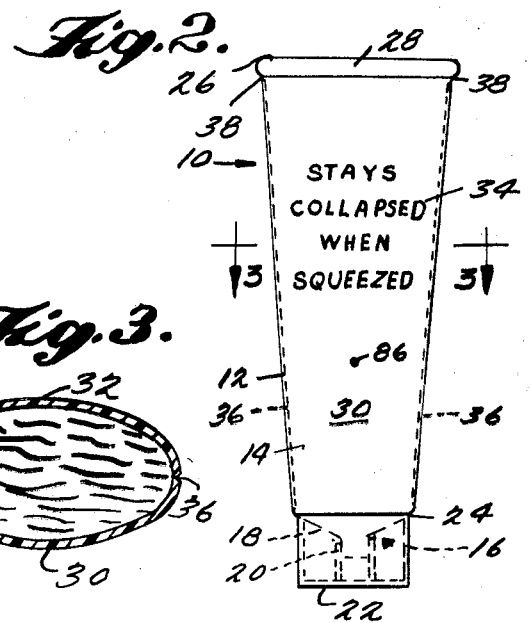
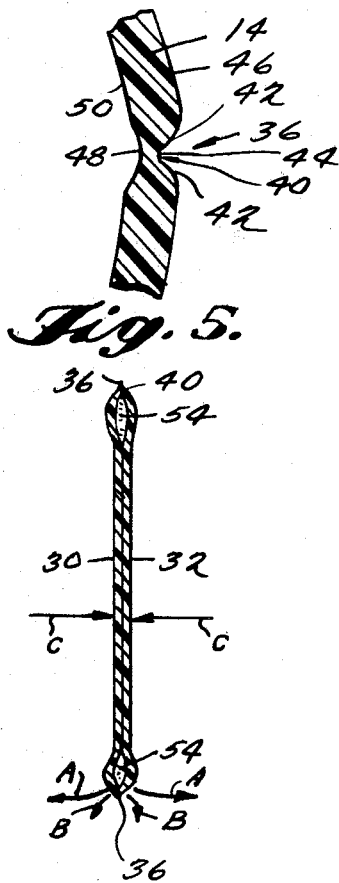
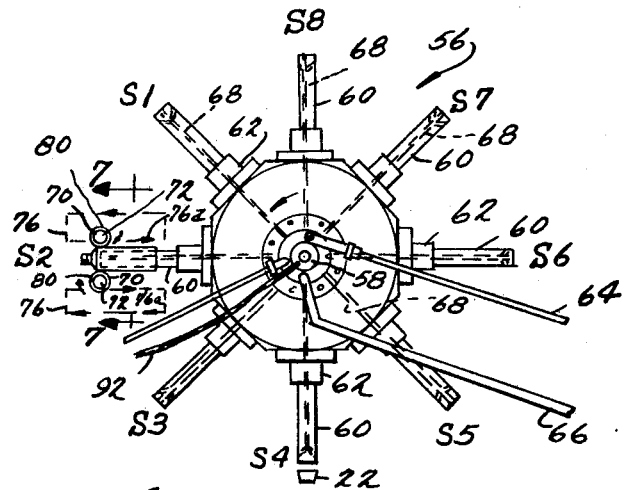
INVENTOR
LOUIS J. TRECEK
BY Cushman, Darby & Cushman
ATTORNEYS

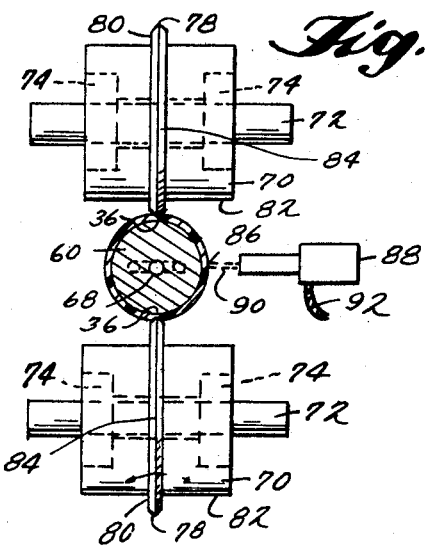
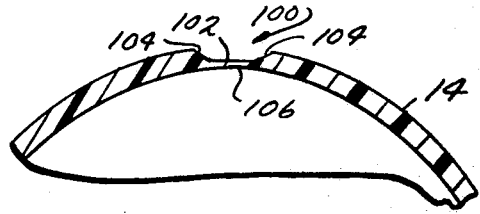
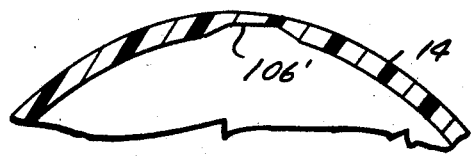
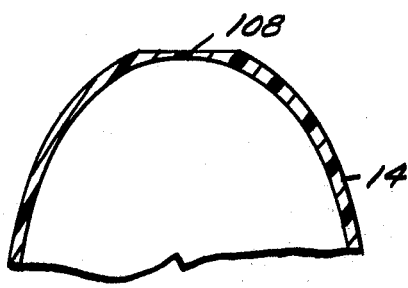
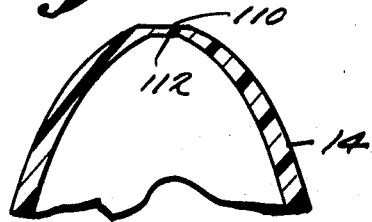
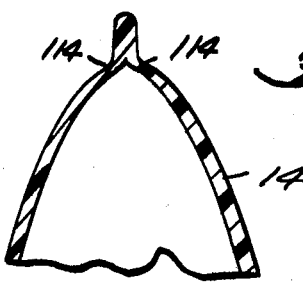

United States Patent Office 3,504,067
Patented Mar. 31, 1970

3,504,067
METHOD AND APPARATUS FOR MANUFACTURING COLLAPSIBLE FLEXIBLE PLASTIC CONTAINER TUBES
Louis J. Trecek, Metuchen, N.J., assignor, by mesne assignments, to Dart Industries Inc., a corporation of Delaware
Original application Nov. 10, 1965, Ser. No. 507,108, now Patent No. 3,353,714, dated Nov. 21, 1967. Divided and this application Aug. 15, 1967, Ser. No. 669,337
Int. Cl. B29c *15/00;* B29d *23/20*
U.S. Cl. 264—40        5 Claims

ABSTRACT OF THE DISCLOSURE

Diametrically opposed relatively narrow, longitudinally extending, sharply defined regions of thickness discontinuity are provided in the sidewall of a collapsible, flexible plastic container tube. Sensing the location of a contrast spot on the tube permits accurate, uniform placement of the two discontinuity regions on the tube, and of the tube end.

---

This application is a division of my copending application, Ser. No. 507,108, filed Nov. 10, 1965, now U.S. Patent 3,353,714, issued Nov. 21, 1967.

The present application relates to apparatus and a method for manufacturing flexible plastic tubes which collapse and stay collapsed as the contained material is squeezed out.

In the flexible tube field, the most familiar package is one having a screw on cap, a frusto-conical shoulder and a hollow cylindrical body which transists to a flat front-flat back structure terminating in an end seam. These tubes were traditionally made of lead, tin, aluminum zinc or other relatively ductile metal that would retain a cylindrical shape before filling and when squeezed to extrude its contents would collapse and stay collapsed.

As flexible plastic materials became available for general packaging applications much of the packaging market was captured by such materials while paper, metal and other traditional materials were to some extent displaced.

So too in the tube field, metals which had certain disadvantages such as expense, weight, lack of adaptability to new package fabricating, printing and merchandizing innovations, reactivity with frequently packaged materials and susceptibility to corrosion and to rupture upon repeated flexing, were in many instances rather rapidly displaced by flexible plastic materials.

It was perhaps at this point in time that the propensity of metal tubes to stay collapsed after being squeezed was first fully appreciated, because notwithstanding the numerous advantages of flexible plastic tubes over metal ones, their property of inherent hysterisis or "memory" causes plastic tubes to reassume their unsqueezed, tube-full shape after being squeezed even when almost empty. To many consumers this property of plastic tubes is annoying since the user cannot ascertain, short of weighing the tube, just how much product is left in the tube. In addition, as a squeezed plastic tube is released, and begins regaining its tube-full shape, product in the neck and forward end of the tube is sucked-back and air is drawn into the tube. This suck-back phenomenon is undesirable from at least two aspects. Firstly, when the tube is squeezed the next time to dispense products the product will splutter from the tube as clots of product alternate with pockets of air. Secondly, the oxygen in the air that is sucked into tubes will cause oxidation and spoilage of many products and where the vapor pressure of any product constituent is relatively high the constituent will vaporize into the air sucked into the tube then be expelled with this air the next time the tube is squeezed. Over a period of time, this action results in the product becoming poor in volatile constituents. Such oxidation and drying out causes some tubes of product to become worthless long before all of the product has been dispensed.

With the problem so evident and clearly defined, asking the question, "Why don't those who are skilled in the art transfer the answer from solved metal tube collapsing problems to the flexible plastic tube quandry" seems inescapable. In fact, all problem solutions cannot be reliably transfered between flexible plastic tube and metal tube technologies since the metals from which collapsible tubes are made freely allow easy collapse by yielding due to their malleability, whereas the memory property which predominates in plastic tubes causes them to flex elastically instead.

A solution to the plastic tube collapsing problem, to be successful and acceptable must not significantly depreciate the advantages that plastic tubes have over tubes of other material, particularly with respect to ease of manufacture on high speed automatic machinery, durability, reliability, cost and attractiveness of the finished article.

Heretofore, although much effort has recently been expended, no solution which is satisfactorily acceptable has been found. One type of proposed solution involves the interposition of one-way valving means such as a ball check, flapper or slit diaphragm valve in the throat of the tube neck. Such a provision inherently results in disfiguration of the stream of product as it is squeezed from the tube. In addition such valving is susceptible to jamming as the product cakes on it or its seat and so disproportionately increases the price of the tube in relation to its limited success in solving the suck-back problem.

Taking a different tack, others have proposed to solve the problem by making the front and back faces of the tube grip one another once they are squeezed into contact with each other. It has been proposed to accomplish this by coating the inside surface of the tube with a material that will stick to itself upon contact and by securing interdigitatable zipper-like structures on the inside of the tube. This type of solution is inelegant from the standpoint that it results in interference of the movement of product normal to the inside surface of the tube so that the tube cannot be emptied of product to the extent a collapsible metal tube can, results in the tube feeling oddly lumpy as it is squeezed, increases the amount of material used to fabricate the tube, and thus its cost.

Recent attempts to solve the suck-back problem have even extended to the self-defeating proposal from a plastic tube makers standpoint of including strips of malleable metal in the tube walls which will bend as the tube is squeezed, then hopefully restrain the plastic material from recovering its former shape.

Recognizing the insufficiency, inelegancy and the failure of prior art attempts to solve the suck-back problem, it is the primary raison d'etre of the present invention to provide a means, and a method for solving the flexible plastic tube suck-back problem completely and to provide flexible plastic tubes that can be easily manufactured on high speed automatic machinery, that are acceptably durable and reliable that are attractive to look at and to use, whose cost of manufacture is not significantly greater than that of conventional flexible plastic tubes, yet which possess the highly desirable property that when they are squeezed they stay collapsed.

Stated simply, it is an object of the present invention to provide apparatus and a method for manufacturing flexible plastic tubes having at least two substantially diametrically opposed longitudinally spaced narrow regions of decreased wall thickness which overcome the tendency of plastic tubes to reassume their tube-full shape after being squeezed.

These and other objects of the present invention as well as its principles and scope of applicability will become more clearly apparent as various aspects of the invention are expanded upon in the following discussion which is related to the embodiments of the invention that are shown in the attached drawing.

FIGURE 1 is a side elevation of a collapsible flexible plastic tube according to the present invention;

FIGURE 2 is a front elevation view of the tube of FIGURE 1;

FIGURE 3 is a transverse cross-section taken substantially along line 3—3 of FIGURE 2;

FIGURE 4 is an enlarged fragmentary transverse cross-sectional view of the circled region of FIGURE 3;

FIGURE 5 is a transverse cross-sectional view of the tube of FIGURES 1–4 in a collapsed condition;

FIGURE 6 is a diagrammatic view of apparatus for forming the collapsible flexible plastic tubes of the present invention;

FIGURE 7 is a sectional view taken substantially along the line 7—7 of FIGURE 6; and FIGURES 8, 9 10, 11 and 12 are sectional views similar to FIGURE 4 of modifications of the sidewall longitudinal discontinuity.

A partly full tube 10 is shown in FIGURES 1 and 2. The tube 10 is composed of flexible plastic material such as polyethylene; polypropylene; plasticized polyvinyl chloride; "Surlyn," an ionomer manufactured by E. I. du Pont de Nemours & Co. Other flexible plastic materials suitable for making conventional flexible plastic tubes can be used to make the collapsible flexible plastic tubes of the present invention.

The plastic tube 10 comprises a unitary flexible body 12 including a tubular sidewall 14 and an end assembly 16 consisting of a frusto-conical, annular shoulder 18 joined at its outer periphery to one end of the sidewall 14 and a tubular neck 20 which is joined at one end to the inner periphery of the shoulder 18 and is usually exteriorly threaded to threadably receive an interiorly threaded closure cap 22. Where non-threaded caps are to be received, complementary closure receiving means are formed on the neck 20 exterior. Fabrication of the tube body as thus far described can be accomplished by extruding the side wall 14 as a continuous tubular element which is subsequently severed into desired lengths each being then secured to a separately formed end assembly 16 at the shoulder line 24 by heat welding, solvent welding or the like. Alternatively, the tube body 12 can be formed as a single unit by blow molding, injection molding, vacuum forming, impact extrusion and similar techniques.

In the tube industry, tubes each having a tubular sidewall, an end assembly and a secured closure cap are usually the end product of the tube fabricator. In the majority of instances product identification, motivational and instructive indicia as well as a transparent protective coating over the indicia are also applied by the tube fabricator. Accordingly, the customer of the tube fabricator need only insert product through the end 26 of the tube and seal the end 26 closed by applying heat and pressure between flat platens to form a transversely extending sealed strip 28 where what has become the front 30 and back 32 of the tube 10 by virtue of the orientation of the indicia 34, are fused to one another.

Giving attention to FIGURES 1, 3 and 4, it should now be noticed that in contrast to conventional flexible plastic tubes which have a substantial uniform thickness throughout their sidewall circumference, the tube 10 is provided with two substantially diametrically opposed narrow, longitudinally extending regions of sidewall thickness discontinuity at 36 where the sidewall is of reduced thickness compared with the remainder of the sidewall. Further, it will be noticed that the regions of thickness discontinuity 36 extend from substantial registry with the opposite ends 38 of the transversely extending sealed strip 28 at one end of the tube sidewall to points slightly short of the shoulder line 24.

According to the preferred embodiment of the present invention the discontinuities 36 are cold rolled into the sidewall 12 from the exterior thereof with circumferentially ribbed wheels, while the tube is mounted on a cylindrical mandrel. Accordingly, the tube is squeezed between the wheels and the mandrel and the discontinuities formed as the plastic material constituting the tube sidewall undergoes cold flow away from the point where pressure is being applied. As will be appreciated, this results in a slight stretching of the tube sidewall 12 in a circumferential direction so that as seen in FIGURE 4 each thickness discontinuity 36 comprises an outwardly facing groove 40 having outwardly convex, outwardly divergent sides 42 and a flat bottom 44 in the outer peripheral surface 46 of the tube sidewall and an inwardly facing depression 48 in the inner peripheral surface 50 of the tube sidewall 12 in radial registry with a groove 40. Each depression 48 is radially inwardly concave about a line parallel to the longitudinal axis of the tube 10 adjacent its own longitudinal centerline and inwardly convex adjacent each lateral margin. The width of each discontinuity 36 as observed from a position normal to the exterior of the tube 10 is slightly narrower than the width of the same discontinuity 36 as observed from the interior of the tube 10. In other words, the grooves 40 are slightly narrower in an arcuate direction than the depressions 48 in the preferred embodiment shown in FIGURE 4. In the preferred embodiment, by way of example, the radial thickness of the sidewall 12 except in the regions of discontinuity is 0.018 inch, each groove 40 is 0.008 inch deep at its longitudinal midpoint and each depression 48 is 0.005 inch deep at its longitudinal midpoint. Each groove flat bottom 44 is 0.003 inch wide, each groove 0.015 inch wide at its mouth and each depression 0.021 inch wide at its mouth. With this example having been given, it should be apparent that the dimensions can be scaled to provide thickness discontinuities according to the present invention in flexible plastic tubes having thicker and thinner sidewalls. It should also be recognized that the above dimensions are approximate to the extent that industrially available flexible plastic tubing having a nominal wall thickness of 0.018 inch may actually vary between 0.010 inch and 0.025 inch. Due to this variation the nominal thickness of the tube sidewall at each discontinuity longitudinal center line of 0.005 inch may vary from about 0.0025 inch to about 0.007 inch.

The contained product can be expressed from the tube 10 through the neck 20 by removing the cap 22 and squeezing in the direction of the arrows 52 (FIGURE 1). When pressure is released the remaining product will not suck back through the neck and into the body, nor will air be sucked through the neck into the tube, nor will the tube regain its pre-squeezed shape. Instead, the squeezed tube will stay collapsed with the inner peripheral surfaces of the tube sidewall defining a substantially minimum volume for the amount of product contained.

It is logical to question whether the provision of several arcuately spaced discontinuities 36, either evenly spaced throughout the circumference of the tube sidewall or closely adjacent one another in clusters at the two junctures of the front and back of the tube would enhance the collapsing feature of the tube 10. If the tube 10 were a metal or paper one the question could be answered with an emphatic yes, since the discontinuities would essentially constitute weakened score lines having a lower yield point than the remaining, thicker regions of the sidewall. Surprisingly, it has been determined in the present instance that the provision of additional thickness discontinuities 36 in the flexible plastic tube in clusters adjacent the two diametrically opposed thickness discontinuities 30 shown on the tube 10 detract from rather than enhance the desirable collapsing feature.

Comparing the cross-sectional view of the tube sidewall 12 in FIGURE 3 where the tube contains product with that of FIGURE 5 taken at the same point on the tube 10 but after the product has been squeezed toward the tube neck 20 from the region shown and out of the tube it can be seen that the grooves 40 have everted from depressions to ridges on the outside surface of the sidewall 12 and that the central regions of the front and rear inner peripheral wall surfaces are in contact with one another. The eversion is seen to leave two insignificantly small longitudinally extending beads 54 of product laterally adjacent each discontinuity 36. Unlike metal tubes, the collapsible flexible plastic tube at the point shown in FIGURE 5 can be intentionally expanded to the condition shown in FIGURE 3, when the tube is partly full and the tube cap is on, by squeezing some of the product from a fat part of the tube into the collapsed part. For this reason, in order to utilize gravitational force to maintain the bulk of the remaining product near the neck of the tube, it is desirable to store the tube 10 standing on its cap 22, although this is by no means a requirement.

The action of the tube in collapsing from its FIGURE 3 position to its FIGURE 5 position upon application of normal force and dispensing of some product from the tube 10 can in some respects be considered to simulate at each discontinuity 36 the action of a student's ring binder notebook, which if urged part of the distance toward an open condition and released will spring shut again but if urged toward an open condition beyond a certain point and released will spring open rather than closed. Similarly, compressive normal force applied to the filled tube 10 with the cap 22 off in everting the discontinuities 36, merely translates them between two stable states. In the state shown in FIGURE 5, the eversion produces tensile stresses in the tube sidewall adjacent the discontinuities in the direction of the arrows A. Because of the thinness of the tube sidewall centrally of each discontinuity 36 the plastic memory forces, represented by the arrows B, tending to restore the tube to its FIGURE 3 shape more than balanced by the forces at A. So aided by the forces at A, air pressure directed as indicated by the arrows C helps maintain the tube 10 in a collapsed condition whereas this force cannot alone overcome plastic memory forces in conventional flexible plastic tubes.

Apparatus for forming the thickness discontinuities is shown in FIGURES 6 and 7 wherein 56 indicates a capper wheel having conventional motor, transmission and timing means 58 intermittently rotating the wheel 56 about its horizontal axis. A plurality of cylindrical mandrels 60 project radially outwardly from the radially outer surface of the wheel. Each mandrel is mounted at 62 for guided rotation about its own longitudinal axis as it reaches stations S2 and S4 for reasons to become apparent. A compressed air line 64 connected to the wheel 56 at 66 for communication at station S5, S6, S7 and/or S8 with the exterior of each mandrel 60 via channels 68 which proceed radially and axially through each mandrel and radially inwardly through the wheel. At station S2, two rollers 70 are mounted for free rotation on axles 72 via bearings 74 which in the instance shown, are ball bearing assemblies. The axles 72 are horizontal in longitudinal extent and are mounted for cyclic movement in the paths but not necessarily in the sense indicated by the arrows 76 in FIGURE 6, each cycle of movement being timed by conventional means to coincide with a cessation of movement of the wheel 56, that is, between indexes of the wheel. Each index of the wheel advances the mandrels 60 one station and at the time of indexing the rollers 70 are in their outermost position as shown in FIGURE 6, so that they do not interfere with the mandrel 60 which leaves station S2 or that which approaches station S2. It should be noticed that each roller 70 is generally cylindrical and includes a circumferential, radially outwardly projecting central bead 80 which is thickest at its center 78. The rollers 70 used to produce the novel tube 10 having the dimensions stated in the above numerical example each have a surface 82 that is 2.5 inches in diameter a bead 80 that is ¼ inch in radial extent from the surface 82 at the bead apex 84. Each bead 80 in the example is ¼ inch wide in axial extent and the apex angle $\phi$ is 120 degrees.

To roll the thickness discontinuities 36 into a tube 10, the tube in an empty condition and without an end seal is slid onto the radially outer end of an empty mandrel 60 at station 58 or 51 just after the mandrel on which the tube has been placed has been indexed to station 52 the rollers 70 move as indicated by the arrows 76 the bead apices 84 contacting the tube sidewall 14 at diametrically opposed points thereon during the inner portion 76a of the cycle to form the thickness discontinuities 36 in the tube 10 by cold flow and stretching of the plastic material of which the sidewall 12 is composed.

In forming thickness discontinuities 36 of 0.005 inch thickness at their longitudinal center lines in a flexible plastic tube of 0.018 inch wall thickness each roller apex 84 is maintained about 0.004 inch from the outer cylindrical surface of the mandrel during the 76a portion of the cycle.

Preferably, the tubes 10 are printed with indicia including a contrast spot 86 and coated prior to being slid onto mandrels 60. Sensing apparatus, for instance a conventional photoelectric device 88 is placed laterally adjacent station 2 out of the path of the rollers 70 and wheel 56. The device 88, shown in FIGURE 7 includes a lamp which directs a beam 90 toward the tube 10 in station 52 where it is reflected toward a detector in the device. The device 88 operates prior to formation of the thickness discontinuities 36 to detect the presence or absence of the contrast spot 86 upon sensing an absence of the spot in the field of the beam 90, a signal is sent via the electrical connection 92 to a control on the wheel 56 which effects rotation of the mandrel in station 52 until the spot is detected. Since the contrast spot, applied with the printing and other indicia has a fixed relationship relative to the printing and other indicia which determine which will be the front, which the back and which the side margins of the tube, the procedure just outlined ensures that the thickness discontinuities will each be placed accurately at the side margins.

As the tube 10 indexes to station 4 a closure cap is secured to the tube neck. In the present instance this is accomplished by rotating the mandrel 60 while restraining a cap 22 against rotation while presenting it axially toward the tube neck.

Upon reaching the station 5, 6, 7 or 8 depending on whether other operations are to be performed on the tube 10 before it leaves the wheel 56, the tube 10 is blown from the mandrel 60 by compressed air blown through the channels 68. Each tube 10 so formed is ready for filling with product after which the tube can be sealed at 28, preferably by apparatus which senses the contrast spot 86 orients the filled tube 10 so the platens form the seal 28 so that its ends 38 intersect both regions of thickness discontinuity 36 at that end of the tube.

Although, the regions of discontinuity 36 preferably resemble in cross-section the embodiment shown in FIGURES 1-5 and are emplaced as discussed in regard to FIGURES 6 and 7, other cross-sectional configurations and methods for forming them in tube 10 sidewalls 12 at opposite lateral margins thereof will provide much of the desired flexible plastic tube collapsibility afforded by the embodiments of FIGURES 1-7. Several of such modifications are shown in FIGURES 8-12 each can be formed by extrusion through a complementary shaped die, although better collapsibility is achieved by rolling the regions of thickness discontinuity into the sidewall 12 because of the effects brought about by stretching and cold flow during rolling. In the embodiment shown in FIGURE 8, the groove 100 includes a flat central region 102 which is arcuately wider than the corresponding element in FIGURE 3 and flaring sidewalls 104 which diverge to a greater extent than the corresponding elements in FIGURE 3. The inwardly facing depression 106 is substantially identical to the depressions 48. In FIGURE 9, a deep depression 106' has been formed interiorly of the tube, in FIGURE 10, a flat 108 exteriorly of the tube and in FIGURE 11 corresponding flats 110, 112 interiorly as well as exteriorly of the tube. In each instance the provision results in a thickness discontinuity, a narrow thin line, repeated on the diametrically opposite side (not shown) of the tube sidewall. In FIGURE 12 a closely spaced pair of thin regions 114 are formed by cold flow and stretching at diametrically opposite sides of the tube 14 by engaging and squeezing a short strip of the sidewall 14 at each lateral margin between opposed rollers. The tube so produced has somewhat less pronounced collapsibility than the tube embodiment of FIGURES 1–5, yet it represents a vast improvement over prior art non-collapsing flexible plastic tubes.

It should now be apparent that the invention as described accomplishes each of the objects set forth at the beginning and that the exemplary embodiments clearly illustrate the invention's principles.

I claim:
1. A process for forming the sidewall of a collapsible, flexible plastic container tube initially having an open end and a tubular incipient sidewall comprising: supporting the tube internally through said open end by engaging the inner peripheral surface of said tubular incipient sidewall; and rollingly squeezing into said tubular incipient sidewall from the exterior thereof two relatively narrow, longitudinally extending diametrically opposed, sharply defined regions of thickness discontinuity where the tubular sidewall is substantially thinner than the remainder of the tubular sidewall while within the ambit of the step of squeezing, the exterior of said tubular incipient sidewall, angularly adjacent said two regions, remains radially unconfined and removing the support through said open end.

2. A process for forming the sidewall of a collapsible, flexible plastic container tube initially having an open end and a tubular incipient sidewall comprising: supporting the tube internally through said open end by engaging the inner peripheral surface of said tubular incipient sidewall; and squeezing into said tubular incipient sidewall two relatively narrow, longitudinally extending diametrically opposed, sharply defined regions of thickness discontinuity where the tubular sidewall is substantially thinner than the remainder of the tubular sidewall; and removing the support through said open end; the outer peripheral surface of the tubular incipient sidewall being provided with applied indicia including a contrast spot prior to being supported; and further including sensing for the presence of the contrast spot along a fixed path which intersects the outer peripheral surface of the tubular incipient sidewall prior to squeezing the regions of thickness discontinuity into the tubular sidewall, and rotating the container tube until the presence of the contrast spot is sensed whereby the regions of thickness continuity when squeezed into being have the same spatial relationship with respect to the printing on successive tubes.

3. The process of claim 2 further including closing said open end after the support is removed.

4. The process of claim 3 further comprising again sensing the presence of the contrast spot prior to closing said open end, and rotating the container tube until the presence of the contrast spot is sensed thus forming a transverse line of sealing having its opposite ends intersect the two regions of thickness discontinuity to thereby close said open end uniformly on successive tubes.

5. Apparatus for forming the sidewall of a collapsible, flexible plastic container tube initially having an open end and a tubular incipient sidewall comprising: mandrel means for removably supporting the tube internally through said open end by engaging the inner peripheral surface of said tubular incipient sidewall; means for squeezing into said tubular incipient sidewall two relatively narrow, longitudinally extending, diametrically opposed, sharply defined regions of thickness discontinuity where the tubular sidewall is substantially thinner than the remainder of the tubular sidewall; the mandrel means comprising at least one mandrel having a cylindrical outer peripheral surface of a diameter to coextensively engage the inner peripheral surface of the tubular incipient sidewall, the means for squeezing comprising a pair of freely rotatable rollers each having a circumferential bead; each bead comprising a circumferential apex defined at the juncture of opposed generally frusto-conically curved sides; means for sensing along a fixed path which intersects the outer peripheral surface of the tubular incipient sidewall the presence of a pre-applied contrast spot on the outer peripheral surface of the tubular incipient sidewall before the squeezing means contacts the tube sidewall; means for rotating said mandrel and tube in response to a sensation of the absence of said contrast spot until said contrast spot is sensed by said sensing means, whereby the tube is oriented with respect to the squeezing means so that the squeezing means operates on like portions of successive tubes.

References Cited
UNITED STATES PATENTS

| | | | |
|---|---|---|---|
| 2,016,425 | 10/1935 | Goessling | 264—322 XR |
| 3,126,431 | 3/1964 | Harder | 264—40 |
| 3,205,289 | 9/1965 | Carpenter | 264—280 |
| 3,300,555 | 1/1967 | Bild | 264—95 |
| 3,350,492 | 10/1967 | Grootenboer | 264—320 |
| 3,374,298 | 3/1968 | Studen | 264—41 |
| 3,320,225 | 5/1967 | Bradbury | 264—210 XR |

ROBERT F. WHITE, Primary Examiner

R. R. KUCIA, Assistant Examiner

U.S. Cl. X.R.

18—14; 264—132, 296, 230